United States Patent [19]

Ikeuchi et al.

[11] Patent Number: 5,293,471
[45] Date of Patent: Mar. 8, 1994

[54] GRAPHICS PROCESSING SYSTEM FOR DELETING ONE OF OVERLAPPING LINE AND GRAPHICS IMAGES

[75] Inventors: Tsutomu Ikeuchi; Hirohiko Higasa, both of Yokohama, Japan

[73] Assignee: Hitachi Software Engineering Co., Ltd., Yokohama, Japan

[21] Appl. No.: 580,077

[22] Filed: Sep. 10, 1990

[30] Foreign Application Priority Data

Sep. 8, 1989 [JP] Japan ................................. 1-233459

[51] Int. Cl.⁵ .............................................. G06F 15/62
[52] U.S. Cl. ...................................... 395/143; 395/133; 395/135
[58] Field of Search ................................ 395/133–135, 395/144–148, 119–122, 143

[56] References Cited

U.S. PATENT DOCUMENTS

| | | | |
|---|---|---|---|
| 4,641,255 | 2/1987 | Hohmann | 395/135 |
| 4,737,916 | 4/1988 | Ogawa et al. | 395/135 X |
| 4,992,780 | 2/1991 | Penna et al. | 395/122 |
| 5,093,798 | 3/1992 | Kita | 395/135 |

Primary Examiner—Gary V. Harkcom
Assistant Examiner—Almis Jankus
Attorney, Agent, or Firm—Fay, Sharpe, Beall, Fagan, Minnich & McKee

[57] ABSTRACT

A graphics processing system arranged to display on a display screen of a display unit a line image produced on the basis of image data stored in a storage and graphics produced on the basis of vector data stored in the storage in an overlapping manner contains a line image delete processing unit for implementing delete processing of the line image in a segment in which a pixel displaying the graphics is displayed so as to overlap with a pixel displaying the line image, wherein the line image delete processing unit is arranged so as to leave only the pixel displaying the graphics undeleted yet to delete the pixel displaying the line image within a range from a range which is broader than a predetermined line width of a distorted line to a line width of the line image.

6 Claims, 5 Drawing Sheets

GRAPHICS PROCESSING SYSTEM FOR DELETING ONE OF OVERLAPPING LINE AND GRAPHICS IMAGES

BACKGROUND OF THE INVENTION

The present invention relates to a graphics processing system and, more particularly, to a graphics processing system adapted to improve the quality of display on a screen by appropriately deleting a line image in a segment in which the line image is displayed under or overlaps with graphics produced on the basis of vector data.

Heretofore, a graphics processing system as a computer-aided design (CAD) system or the like forms graphics data of vector data from an original image data of a line image of a drawing inputted from an image input device such as an image scanner. In this case, the original image data of a line image is displayed on the display screen of a display device so as to overlap with the graphics data of the vector data, and the graphics data is formed by inputting a line connecting one terminal point (start point) to another terminal point (end point) of the graphics data on the display screen by means of a pointing device such as a mouse from the state of a line, such as a line width, a line length and a line shape of the line image and consequently by forming line vector data. And, the line image to be disposed under the line vector data inputted is processed so as to be deleted on the display screen in order to permit an easy look at the display screen.

In such a graphics processing system, however, the processing of deleting the line image in a segment in which the line image is disposed under or overlap with the display image of the graphics data may be implemented, for example, by setting a constant line width of the pixels of a graphics locus obtainable by an experience value in an orthogonal direction as the object for deletion and deleting the line image within the range of the line width thereof. Therefore, there is the risk that a portion of the line image which is not the object for deletion and which is located in the vicinity of the line image as the object for deletion is to be deleted and that a portion of the line image as the object for deletion, which protrudes from the region of the object for deletion, can be left undeleted.

In the delete processing for the line image displayed under the display image of the graphics data, the range for deletion specified by a line width of the line image is set constant so that a portion of the pixels constituting the line image, which is located outside the range for deletion, is left undeleted or a portion of the pixels which constitutes the line image as the object not to be deleted yet which is located adjacent and within the range for deletion, is deleted. Hence, conventional delete processing allows a portion of the line image to be undeleted or deleted excessively, thereby decreasing the quality of display of a display screen.

SUMMARY OF THE INVENTION

Therefore, it is an object of the present invention to provide a graphics processing system capable of implementing line image delete processing, which can minimize a non-deletion of a portion of the line image to be deleted or a deletion of a portion of the line image to be undeleted and improve the quality of display of the display screen.

In order to achieve the object, the present invention consists of the graphics processing system arranged to display on a display screen of a display unit a line image produced on the basis of image data stored in a storage and graphics produced on the basis of vector data stored in the storage in an overlapping manner, comprising: a first storage means for storing the line image produced on the basis of the image data, a second storage means for storing the graphics produced on the basis of the vector data, and a line image delete processing means for implementing delete processing of the line image in a segment in which a pixel displaying the graphics is displayed so as to overlap with a pixel displaying the line image, wherein the delete processing by the line image delete processing means is implemented so as to leave only the pixel displaying the graphics undeleted yet to delete the pixel displaying the line image within a range from a range which is broader than a predetermined line width of a distortion of a line width of the line image.

With this arrangement, the delete processing to be implemented by the line image delete processing means involves detecting the pixel structuring the line image as the object for deletion within the range which is broader than a predetermined line width of curvature of the line image and which is set up to the edge of the line image, deleting a black pixel in a region of the line image in question and changing it to a pixel of a background color (white pixel). The processing for detecting the pixel structuring the line image as the object to be deleted in the delete processing of the line image involves tracing the pixel structuring the line image in the directions on the left and right sides and perpendicular to the line vector direction of the graphics from a terminal point of the graphics located in a segment in which the line image is to be deleted, as a starting point, and detecting the pixel as the object for deletion within the area of the line image and up to the edge of the line image area until the black pixel (line image) is located no more within the range. Hence, the pixel as the object for deletion can be chosen in the segment, in which it overlaps with the pixel of the graphics, and within the range up to the edge of the area of the line image, thereby minimizing a non-deletion of a portion of the line image to be deleted or a deletion of a portion of the line image to be left undeleted.

In particular, when the line image having a large curvature is to be deleted or a particular line image in the image, such as graphics located nearby the line image is to be deleted, the line image can correctly be deleted from the area of the image as the object for deletion, thereby improving the quality of display and output. Furthermore, the graphics processing system according to the present invention can save laborious operation, such as re-deletion of the portion of the line image left undeleted and recovery of the portion thereof left undeleted yet having been deleted, thereby improving the ability of operation.

Other objects, features and advantages of the present invention will become apparent in the course of the description of the preferred embodiments which follows, in conjunction with the accompanying drawings.

DETAILED DESCRIPTION OF THE PREFERRED EMBODIMENTS

Figure 1:
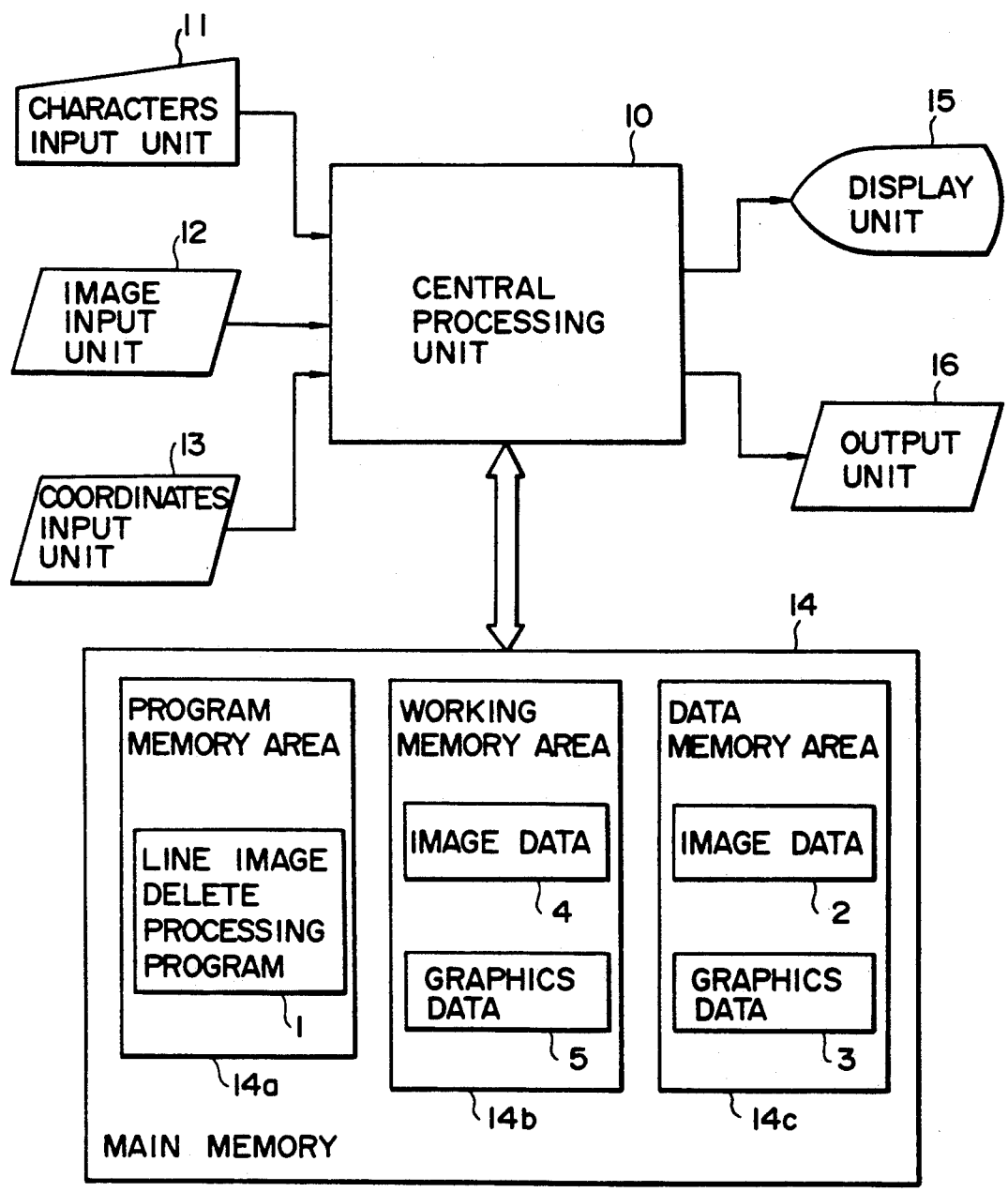
FIG. 1 is a block diagram showing the construction of an essential portion of the graphics processing system according to an embodiment of the present invention.

FIG. 1 is a block diagram showing the construction of essential portions of the graphics processing system according to an embodiment of the present invention. As shown in FIG. 1, reference numeral 10 stands for a central processing unit, reference numeral 11 for a characters input unit, reference numeral 12 for an image input unit, reference numeral 13 for a coordinates input unit, reference numeral 14 for a main memory, reference numeral 15 for a display unit, and reference numeral 16 for an output unit. The graphics processing system according to this embodiment of the present invention is constructed such that the central processing unit 10 is interconnected to a group of input units consisting of the characters input unit 11, the image input unit 12 and the coordinates input unit 13 and a group of output units consisting of the main memory 14, the display unit 15 and the output unit 16.

The central processing unit 10 is a data processor that executes various processings. The characters input unit 11 is to input data such as alpha-numerical characters into the central processing unit 10, the image input unit 12 is to input the image data into the central processing unit 10, and the coordinates input unit 13 is to input the coordinates data into the central processing unit 10. The main memory 14 is provided with a program memory area 14a for storing a program required for processing, a working memory area 14b for temporarily storing data outputted from each storage, and a data memory area 14c for storing the image data or the graphics data. By using these memory areas, the central processing unit 10 proceeds with data processing such as image processing, graphics processing and so on. The graphics data, the image data and so on as a result of processing are outputted from the display unit 15 and the output unit 16. The display unit is to display the image data and the graphics data visibly on a display screen of a cathode ray tube (CRT). The output unit 16 is to output the image data and the graphics data as a hard copy. The program memory region 14a further stores a line image delete processing program 1. When the line image delete processing program 1 is executed, the image data 2 and the graphics data 3, each of which is stored in the data memory area 14c, are used for graphics processing, thereby deleting the line image from the graphics which overlaps with the line image.

In the course of the graphics processing, the result of the data processing so far executed is displayed on the display screen of the display unit 15, and the displayed image data is subjected to delete processing of the line image in order to permit an easy look at the display screen.

Description will now be made of the delete processing of the line image. Suppose that graphics and an image previously inputted are displayed in an overlapped state on the display screen of the display unit 15 and that the data memory area 14c stores the image data 2 for the line image displayed and the graphics data 3. As the data specifying the graphics displayed is inputted from the coordinates input unit 13, the line image delete processing program 1 fetches the object graphics data 3 and the object image data 2 stored in the data memory area 14c and stores them in the working memory area 14b. An overlapped portion of the image data 4 is traced along the graphics data stored in the working memory area 14b, thereby implementing delete processing for the object pixel to be deleted in order.

Specific description will be made of a processing example of the delete processing of the line image displayed in an overlapped manner under the graphics on the display screen.

Figure 2:
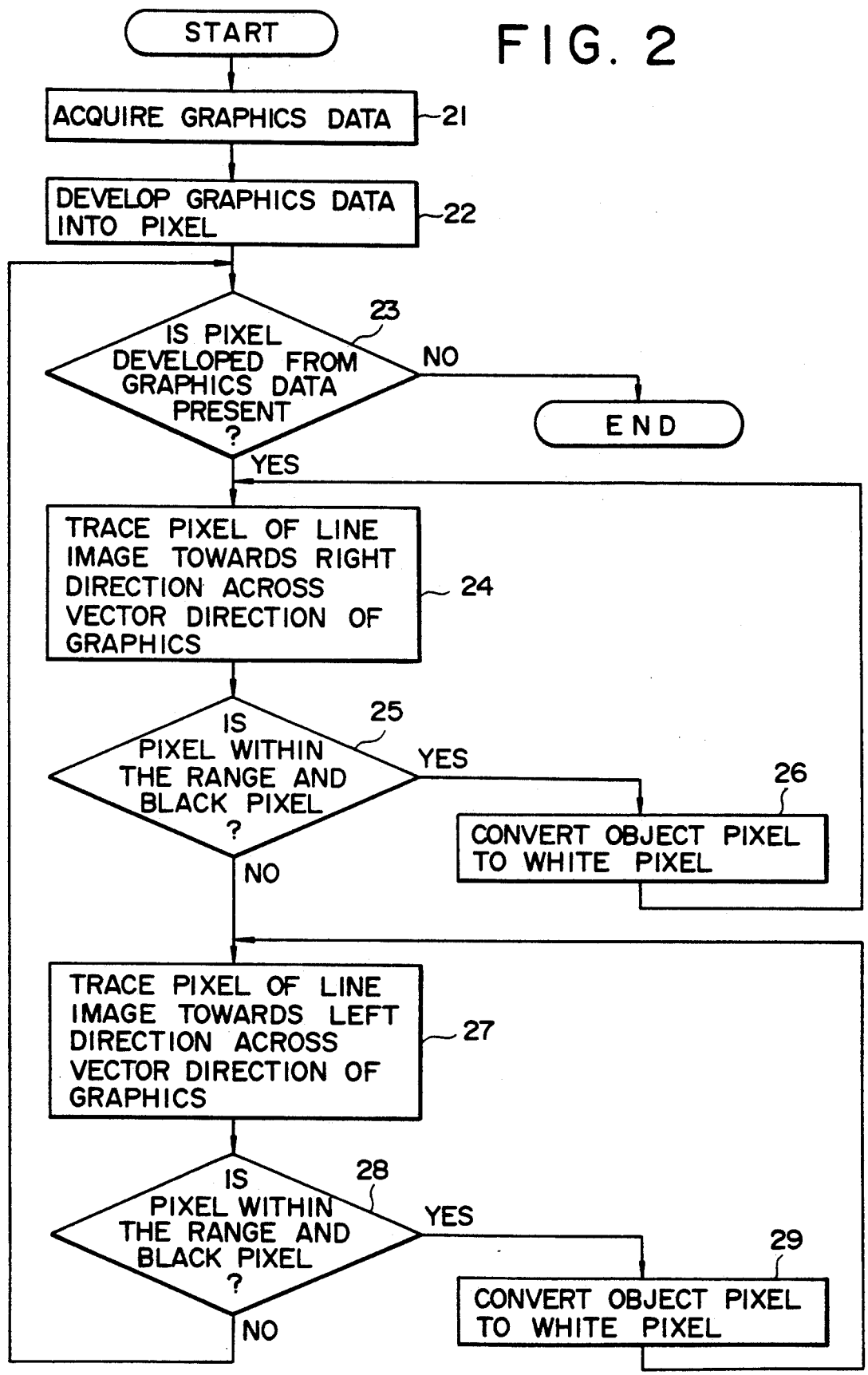
FIG. 2 is a flow chart showing a processing flow of the delete processing of the line image according to an embodiment of the present invention.

FIG. 2 is a flow chart showing a processing flow of the delete processing of the line image according to an embodiment of the present invention.

Description will be made in conjunction with FIG. 2. As the processing starts, the graphics data is acquired at step 21 and the program flow goes to step 22 at which the graphics data is developed into pixels. Then at step 23, a decision is made to determine if there are present the pixels which have been developed from the graphics data in order to determine whether or not to end the processing. When the result of decision at step 23 indicates that there is no pixels developed from the graphics data, on the one hand, then the processing ends. If it is decided at step 23 that there are the pixels developed from the graphics data, on the other, then the program flow proceeds to step 24 at which the pixels of the line image are traced in the right direction across the vector direction of the graphics. Then at step 25, a decision is made to determine if the pixel traced is within the range and further if it is a black pixel. The determination as to whether the pixel traced is within the range is implemented in order to determine as to whether the line image is within the range broader than a statistically predetermined line width of a line distortion. And determination is simultaneously made of the range up to the edge of the line image by determining if the pixel traced is a black pixel. When the result of decision at step 25 indicates that the pixel traced is located within the range and it is the black pixel, then the pixel concerned is determined to be the object to be deleted and the program flow goes to step 26 at which the object pixel is converted into a white pixel. Then the program flow returns to step 24 at which the pixel which follows is traced and the processing is likewise repeated.

If the result of decision at step 25 indicates that the pixel traced neither is located within the range nor is the black pixel, it is determined, for example, that the tracing of the region of the line image up to its right edge has been finished and the tracing of the pixels as the object to be deleted has been finished in the right direction across the vector direction of the graphics. Then, the program flow goes to step 27 at which the pixel of the line image is traced in the left direction across the vector direction of the graphics. The program flow goes further to step 28 at which a decision is made to determine if the pixel traced is located within the range and it is a black pixel. The decision is made for the purpose of determination if the line image is located within the range broader than a statistically predetermined line width of a line distortion. The decision is simultaneously made to determine if the range up to the edge of the line image has been traced by making the decision to determine if the pixel traced is a black pixel. When the result of decision at step 28 indicates that the pixel traced is within the range and it is the black pixel, the pixel in question is decided to be the object to be deleted, followed by proceeding to step 29 at which the object pixel is converted to a white pixel. Then the program flow returns to step 27 at which the pixel which follows is then traced, followed by repeating the processing in the manner as described hereinabove.

When the result of decision at step 28 indicates that the pixel traced is not located within the range and it is not a black pixel, for instance, the tracing of the area of the line image up to its left edge has been finished, thereby finishing the tracing of the pixel as the object to be deleted in the left direction across vector direction of the graphics. This concludes the delete processing of the pixels developed from the graphics data in the right and left directions across the vector direction of the graphics. Then, in order to allow the pixels of the graphics developed to be processed in the manner as described hereinabove, the program flow proceeds to step 23 at which the processing is to be repeated.

Figure 3:
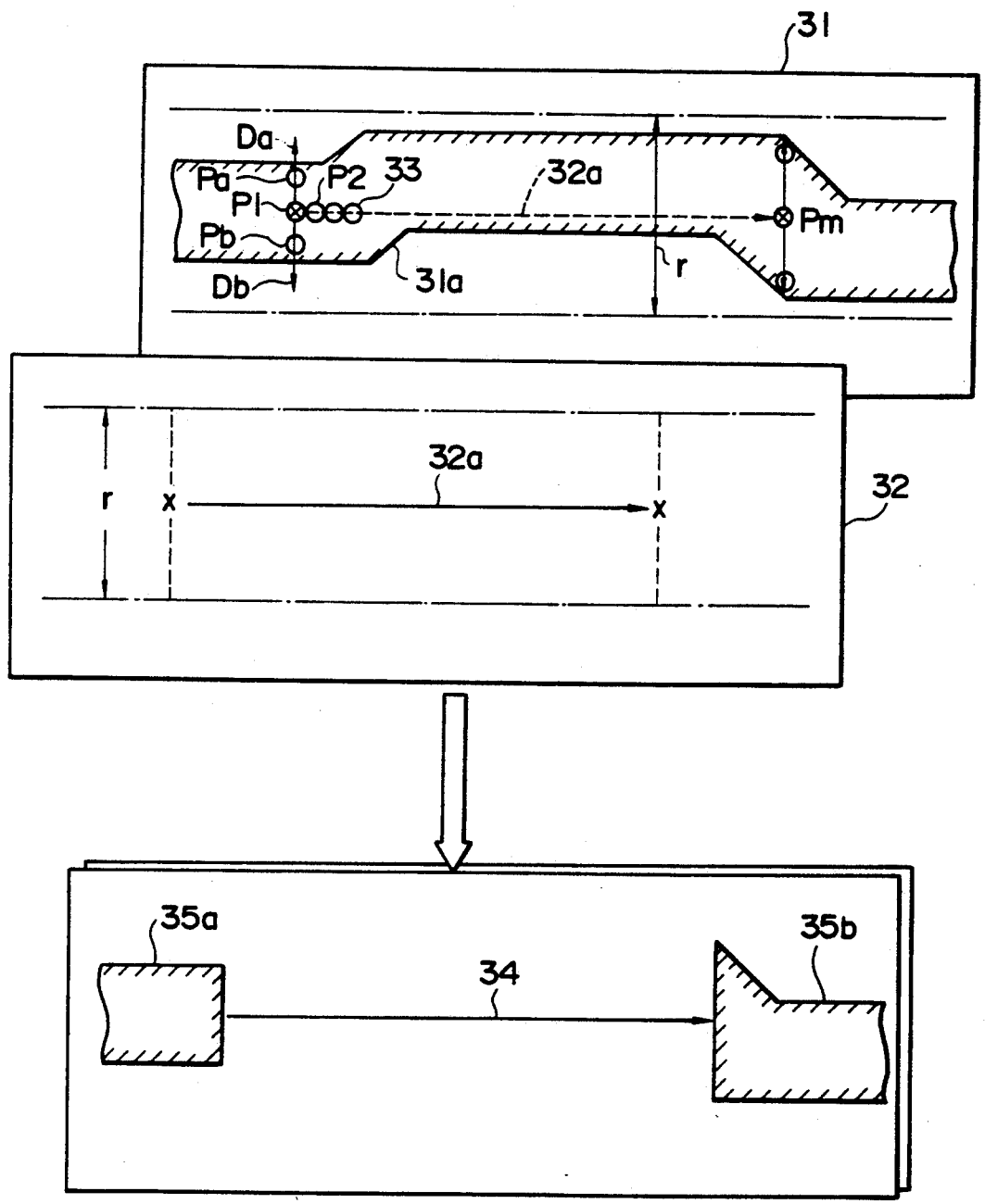
FIG. 3 is an enlarged diagrammatical representation for describing the manner in which each pixel of the line image displayed under the line graphics is to be deleted by means of the delete processing of the line image.

FIG. 3 illustrates the manner in which each pixel of the line image displayed under a line graphics is to be deleted by the delete processing of the line image. The processing in this instance is implemented according to the processing flow as described hereinabove, so that description which follows will be made with reference to the processing steps of FIG. 2.

As shown in FIG. 3, line graphics 32a formed on the basis of vector data of a graphics data area 32 are displayed on a display screen so as to overlap with a line image 31a in an image data area 31. The line image delete processing program 1 develops data of the line graphics 32a acquired into pixels 33 of the line graphics data and stores the pixels 33 thereof in the working memory area 14b (step 22). The processing which follows involves fetching the first pixel P1 of the pixels 33 (step 23) when the pixels 33 of the line graphics data developed are displayed so as to overlap with the line image 31a. From the pixel P1 fetched, the pixel data of the line image 31a stored in the working memory area 14b is traced pixel by pixel in the direction Da perpendicular to and in the left direction across the vector direction of the graphics (step 24). If the object pixel Pa traced is located within the range r of a predetermined line width and it is a black pixel indicative of the pixel of the line image (step 25), then the pixel Pa is determined as the object for deletion and the black pixel in question of the image data 4 stored in the working memory area 14b is converted into a white pixel, thereby deleting the pixel in question (step 26). A series of this processing of deleting the pixels has been implemented by tracing the pixels in order and this processing is repeated for all the pixels until the pixel traced reaches the edge of the line image within the range r in which the decision conditions are not established.

Again, the first pixel P1 of the line graphics data is fetched and the pixel data of the line image 31a stored in the working memory area 14b is traced pixel by pixel from the fetched pixel P1 in the direction Db which is perpendicular to and in the right direction across the vector direction of the graphics (step 27). If the object pixel Pb traced is located within the range r of a predetermined line width and it is determined to be a black pixel indicative of the pixel of the line image (step 28), then the pixel Pb is determined to be an object to be deleted and the black pixel of the image data 4 stored in the working memory area 14b is converted into a white pixel, thereby deleting the pixel in question (step 29). A series of this processing of deleting the pixels has been implemented by tracing the pixels in order and this processing is repeated for all the pixels until the pixel traced reaches the edge of the line image within the range r in which the decision conditions are not established.

The same processing (the processing from step 23 to step 29) is implemented for the second pixel P2 of the pixels 33 developed from the line graphics data. This processing is repeated until the final pixel Pm has been traced. As a result, the delete processing is implemented for the line image 31a of a portion overlapping with and placed under the line graphics 32a in a segment in which the pixel 33 developed from the line graphics data is located, thereby giving a display screen, as shown at the lower portion of FIG. 3, on which the graphics data and the image data are displayed in such a manner that the line graphics 34 and the line image 35a are displayed without overlapping with each other.

Figure 4A:
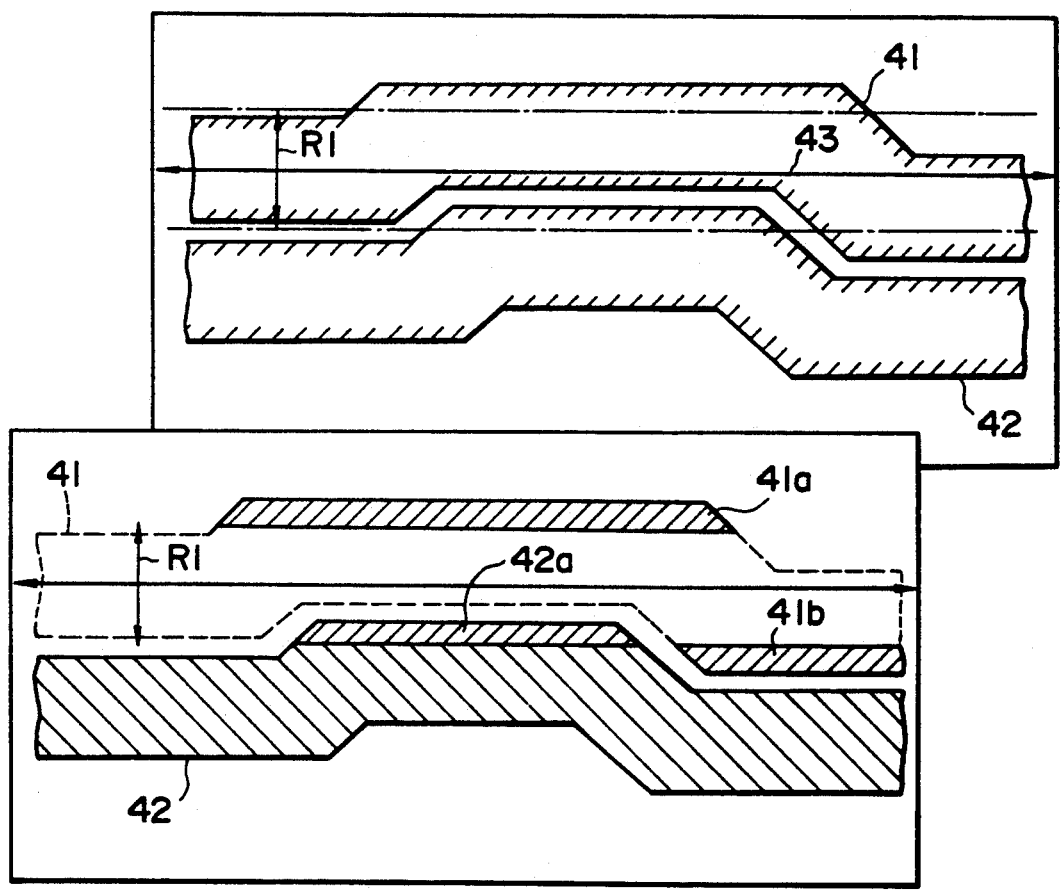
FIGS. 4a and 4b are enlarged diagrammatical representations of processing examples in which an upper line of a partially distorted double-line image is to be deleted.
Figure 4B:
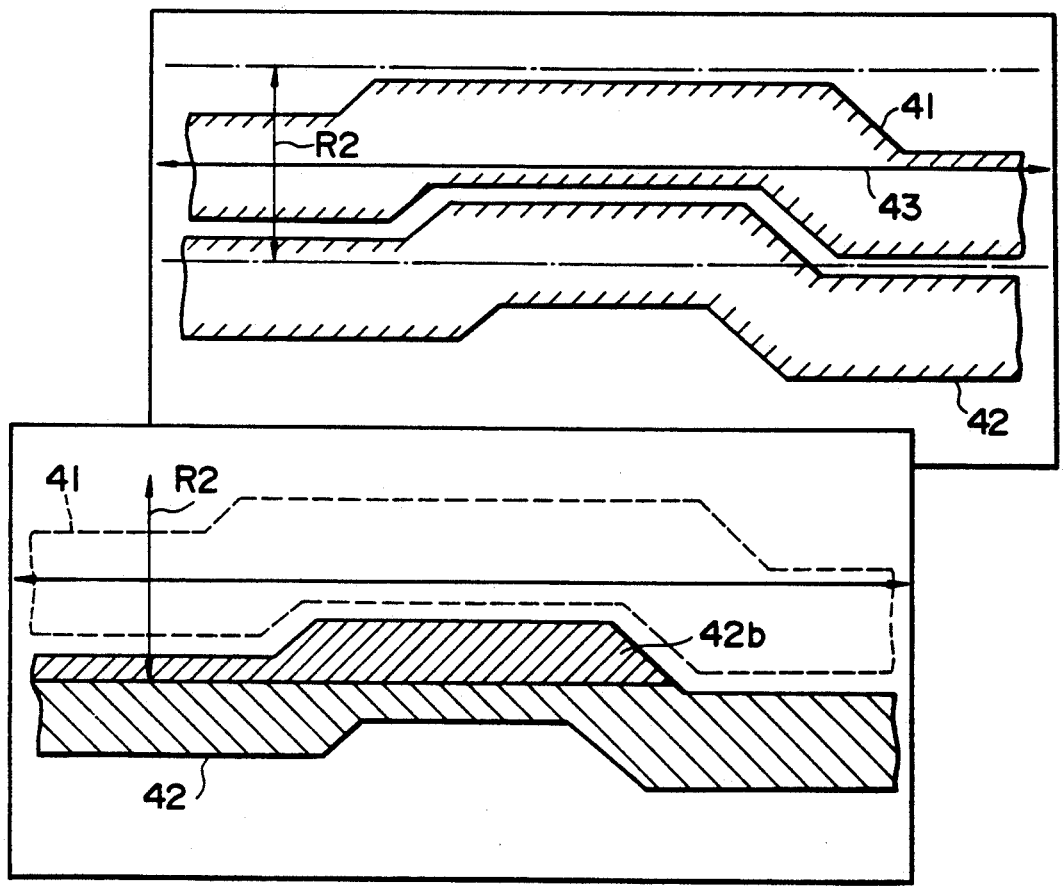

FIGS. 4a and 4b illustrate processing examples in which an upper line of a line image consisting of two lines distorted at their portions is to be deleted. Each of the views shows an example in which the range r of a line width to be used for determination of the object pixel to be deleted is varied. In each case, the line image to be deleted is an upper line 41 of a double-line image in which the upper line image 41 is located nearby a lower line image 42 and line graphics 43 of graphics data are displayed over the upper line image 41 which, in turn, is subjected to delete processing.

FIG. 4a illustrates a processing example in which the range R1 of a line width to be used for determination of the delete processing is set narrower. In this example, the range R1 to be used for determination of the delete processing is set to be substantially as broad as the line width of the line image 14 as the object to be deleted, as well as an upper portion 41a and a lower portion 41b of the line image 41 to be deleted are left undeleted due to the restriction to be placed by the range R1 to be used for determination of the delete processing. It is to be noted herein, however, that a portion 42a of the lower line image 42 which is not the object for deletion is not deleted even if the portion 42a is located within the range R1.

FIG. 4b illustrates a processing example in which the range R2 of a line width to be used for determination of the delete processing is set broader than a line width of the line image 41 which is the object to be deleted. In the delete processing in this instance, the range R2 to be used for determination of the delete processing is set broader than the line width of the line image 41, so that the line image 41 is fully deleted without any portion left undeleted due to the restriction to be placed by the range R2 used for determination of the delete processing. In conventional cases, the line image within the range R2 is deleted as it is so that there is also deleted a portion 42b of the lower line of the double-line line image 42, which is not the object for the delete processing. In this instance, the pixels are traced within the range up to the edge of the line image 41 as the object to be deleted, so that the portion 42b of the line image 42 as the object to be undeleted is left as it is without being deleted.

As described hereinabove, a decision is made to determine that the pixel traced is located within the range and it is a black pixel, so that a portion which should be deleted yet has conventionally been left undeleted can correctly be deleted or a portion which should be undeleted yet has conventionally been deleted can correctly be left undeleted. In other words, it is determined if the line image is located within the range which is set broader than a statistically predetermined line width of a distorted line and if the pixel traced is a black pixel, and this determination is continued to be made until the pixel traced reaches the edge of the line image. This delete processing can correctly delete the line image as the object to be deleted, with a portion of the line image left undeleted or without deleting a portion of a line image which is not the object to be deleted.

Having been described hereinabove specifically by way of examples, the present invention should be understood that it is not restricted to the examples as described hereinabove and it is construed as encompassing various changes and modifications within the scope and spirit of the present invention.

In the graphics processing system according to the present invention, which can process both graphics data and image data, a particular line image can accurately be deleted from an image, such as a drawing in which there is a particularly largely curved line image or in which line images are located nearby each other, thereby improving the quality of a display or output. Further, the graphics processing system according to the present invention can save re-delete processing for a portion left undeleted or recovery processing for a portion that is to be left undeleted yet has been deleted, thereby improving operability.

What is claimed is:

1. A graphics processing system arranged to display on a display screen of a display unit a line image produced from image data stored in a storage device and graphics produced from graphics data stored in a storage device in an overlapping manner, comprising:

display means for displaying the line image and the graphics in an overlapping manner;

first storage means for storing the line image produced from the image data;

second storage means for storing the graphics produced from the graphics data;

line image delete processing means for processing pixels of said image and said graphics data stored in said first and second storage means, respectively, to delete the line image in a segment in which a pixel displaying the graphics is displayed so as to overlap with a pixel displaying the line image, wherein the line image delete processing means is implemented so as to leave only the pixel displaying the graphics undeleted and to delete the pixel displaying the line image that is located within a range that is broader than a predetermined line width of a distorted line up to a line width of the line image; and said line image delete processing means including means for determining if a pixel of the line image is an object for deletion located within said range, and for converting the pixel determined to be the object for deletion into a pixel with a background color with respect to the graphics.

2. A graphics processing system as claimed in claim 1, wherein the pixels of the line image are black pixels and the pixels with a background color are white pixels.

3. A graphics processing system as claimed in claims 1, wherein the means for determining if a pixel is the object for deletion comprises means for tracing the pixels of the line image in directions left, right and perpendicular to a line vector direction of the graphics from a terminal point of the graphics in a segment in which the line image is to be deleted as a starting point.

4. A method for deleting a line image in a graphics processing system for displaying a line image produced from image data stored in a storage device and graphics produced from graphics data stored in a storage device in an overlapping manner, comprising the steps of:

displaying the line image and the graphics in an overlapping manner;

storing the line image produced from the image data in a first memory area;

storing the graphics produced from the graphics data in a second memory area;

processing pixels of said image and said graphics data stored in said first and second memory areas, respectively, to delete the line image in a segment in which a pixel displaying the graphics is displayed so as to overlap with a pixel displaying the line image, wherein said processing includes leaving only the pixel displaying the graphics undeleted and deleting the pixel displaying the line image that is located within a range that is broader than a predetermined line width of a distorted line up to a line width of the line image; and said pixels processing further including determining if a pixel of the line image is an object for deletion located within said range, and converting the pixel determined to be the object for deletion in said determining step into a pixel with a background color with respect to the graphics.

5. A processing method according to claim 4, wherein said displaying displays pixels of the line image as black pixels and pixels with a background color as white pixels.

6. A processing method according to claim 4, wherein said determining includes tracing the pixels of the line image in directions left, right and perpendicular to a line vector direction of the graphics from a terminal point of the graphics in a segment in which the line image is to be deleted as a starting point.

* * * * *